(No Model.)

J. M. DUNKUM.
Raising Tobacco Plants.

No. 238,034.                     Patented Feb. 22, 1881.

WITNESSES:
C. Neveux
J. C. Kernon

INVENTOR:
J. M. Dunkum
BY
ATTORNEYS.

UNITED STATES PATENT OFFICE.

JAMES M. DUNKUM, OF NEW CANTON, VIRGINIA.

RAISING TOBACCO-PLANTS.

SPECIFICATION forming part of Letters Patent No. 238,034, dated February 22, 1881.

Application filed December 28, 1880. (No model.)

*To all whom it may concern:*

Be it known that I, JAMES MUNROE DUNKUM, of New Canton, in the county of Buckingham and State of Virginia, have invented a new and useful Improvement in Raising Tobacco-Plants, of which the following is a specification.

The object of this invention is to furnish an improvement in raising tobacco-plants and protecting the plants from the ravages of the tobacco fly or bug.

The invention consists in protecting tobacco-plants from the tobacco-fly by surrounding the bed with logs, covering the bed with brush, and applying to the logs a mixture of whisky or alcohol, gum-camphor, oil of peppermint, and linseed-oil, as will be hereinafter fully described.

In carrying my invention into practical use, I select good plant-land, fronting south or southeast to secure a good sun exposure, and thus obtain earlier plants. This land I burn over at any time, when dry, between the 15th of December and the 15th of March. The ground is hoed up to the depth of four or five inches without turning the soil over, is chopped fine, and the coarse roots are taken out, the fine roots being left in to prevent the soil from being made too close. For each four square yards of bed I use about one bushel of fine farm-yard or stable manure. The manure used should be entirely free from seeds, to prevent the necessity of uncovering the plants too soon to pull up the grass and weeds. If commercial fertilizers are used, they should be used sparingly. After the plants have come up plaster in small quantities may be used upon the plants at intervals during the plant-season. When the soil is brought into good condition a stout brush should be drawn across the bed until the soil is properly pulverized. The seed should be sown between the 15th of February and the 15th or 20th of March, and the quantity sown should be about one tablespoonful to one hundred square yards of bed. In laying out a plant-bed it is not advisable to make each bed or division larger than four hundred yards.

My plan of laying out a plant-bed will be readily understood by reference to the drawings, wherein—

Figure 1:
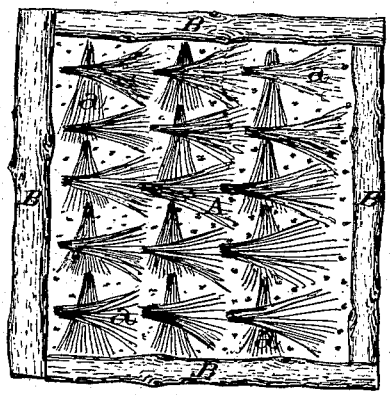
Figure 2:

Figure 1 represents a plan view of the bed, and Fig. 2 a vertical section.

Upon the north, east, south, and west sides of each bed A are placed logs B, with the bark upon them and of any convenient size, one log being placed upon the south side and three arranged one above another upon each of the other sides, to form a wall upon the three sides about three feet high. The bed is then covered to the depth of two or three feet with as nice dogwood or other brush, *a*, as can be obtained, arranged in rows, with the butts overlapping the branches south and west. The bed should be covered with the brush as soon as the seed is sown, and the brush should not be removed until the plants have risen above the ground, and not even then unless it has rained recently or there is a prospect of its raining immediately. When the plants begin to come up apply with a brush along the under side of each bottom log, upon the side toward the bed and all around the bed, the hereinafter-described mixture. The mixture should be applied a second time after an interval of three or four weeks. The logs furnish a ground to receive the mixture and prevent the odor of the mixture from being dissipated by the wind. The mixture is applied to the inner under side of the bottom logs to prevent the ingress of the fly to the bed.

In preparing the mixture I take half a pint of good whisky or alcohol, put into it two drams of gum-camphor and one dram of oil of peppermint, and shake the mixture until the camphor is dissolved. I then add to the compound half a pint of linseed-oil, and the mixture, when well shaken, is ready for use. The mixture should be kept closely corked, and should always be well shaken before being used.

Having thus described my invention, I claim as new and desire to secure by Letters Patent—

1. In raising tobacco-plants, the mode of protecting the plants from the tobacco-fly, substantially as herein shown and described, which consists in surrounding the bed with logs, covering the bed with brush, and applying to the logs a mixture of whisky, gum-camphor, oil of peppermint, and linseed-oil, as set forth.

2. The herein-described composition of matter to be used for protecting tobacco-plants from the tobacco-fly, consisting of whisky, gum-camphor, oil of peppermint, and linseed-oil, in substantially the proportions specified.

JAMES MUNROE DUNKUM.

Witnesses:
WM. R. PUTNEY,
RICHARD PUTNEY.